United States Patent [19]
Bronson

[11] Patent Number: 5,136,655
[45] Date of Patent: Aug. 4, 1992

[54] METHOD AND APPARATUS FOR INDEXING AND RETRIEVING AUDIO-VIDEO DATA

[75] Inventor: Barry S. Bronson, Saratoga, Calif.

[73] Assignee: Hewlett-Pacard Company, Palo Alto, Calif.

[21] Appl. No.: 499,138

[22] Filed: Mar. 26, 1990

[51] Int. Cl.⁵ .................................................. G10L 1/00
[52] U.S. Cl. ............................................. 381/41; 381/43
[58] Field of Search ..................................... 381/41–45; 364/513.5; 369/53, 83

[56] References Cited

U.S. PATENT DOCUMENTS 4,455,634  6/1984  Efron et al. ............................ 381/42
4,700,322  10/1987  Benbassat et al. ................ 364/513.5
4,726,065  2/1988  Froessl .................................. 381/41
4,746,993  5/1988  Tada ...................................... 369/53
4,849,831  7/1989  Hino ...................................... 369/83

Primary Examiner—Dale M. Shaw
Assistant Examiner—Michelle Doerrler

[57] ABSTRACT

A technique is disclosed for processing audio-video data in a storage medium where indexes are generated by automatically extracting and indexing words and pictures in the audio-video data with their corresponding timing or other location data. The indexes permit searching and selective retrieval of word and/or scene data in accordance with location data associated therewith.

8 Claims, 1 Drawing Sheet

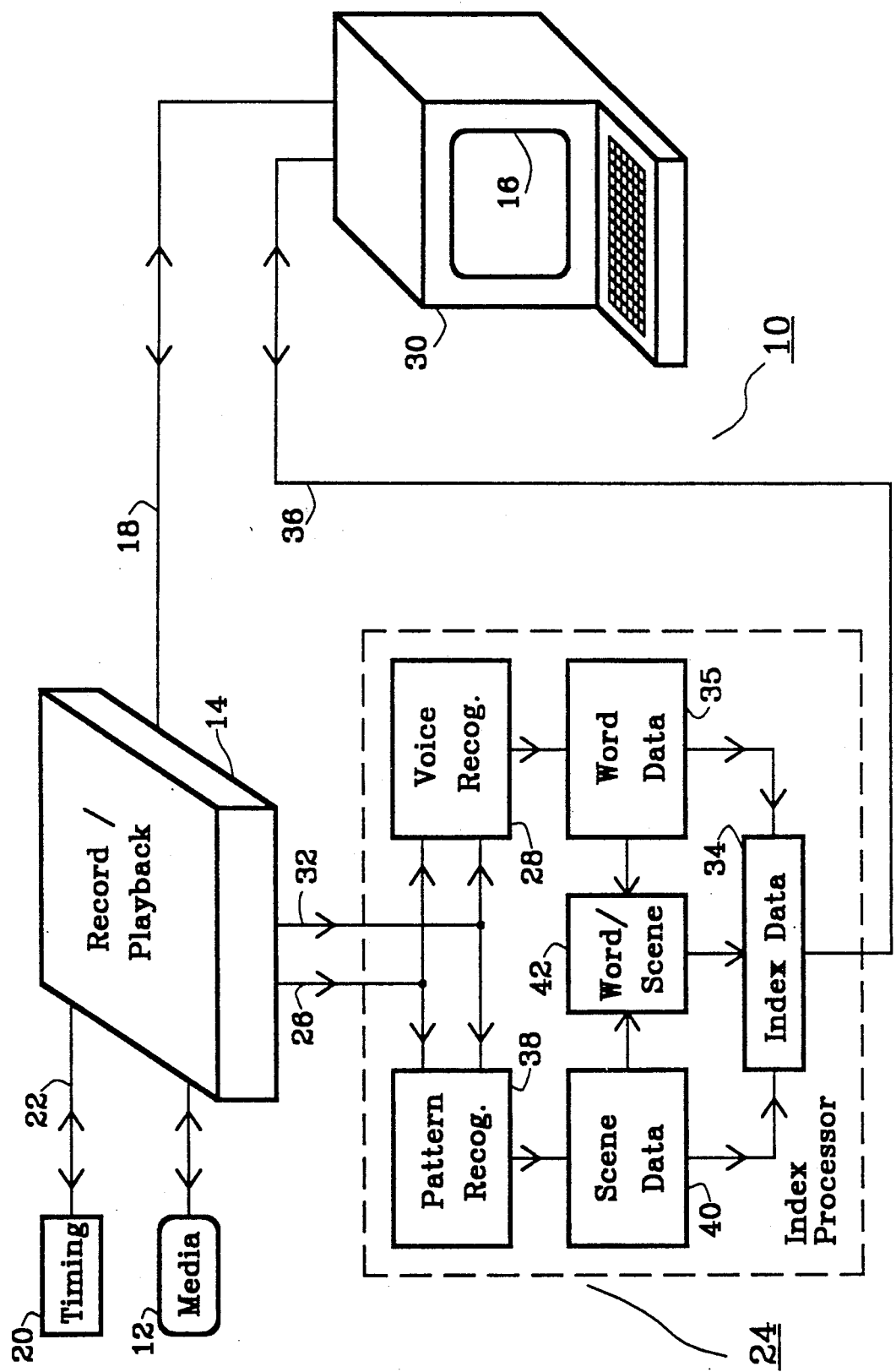

METHOD AND APPARATUS FOR INDEXING AND RETRIEVING AUDIO-VIDEO DATA

BACKGROUND OF THE INVENTION

1. Field of the Invention

This invention relates to audio-video data storage and retrieval and in particular to techniques for the selective retrieval of data stored on audio-video media, such as video tape and video disks.

2. Description of the Prior Art

The conventional approach to retrieving selected data from audio-video media is to monitor the audio-video material and manually select and log the audio-video data to be retrieved and to monitor the corresponding counter, timing or other location data to identify the location of the selected video data. As a simple example, if one desires to selectively retrieve portions of a video tape of an educational lecture according to topic, an index would be manually prepared by a human viewer, who must be sufficiently familiar with the topics discussed on the tape to identify and record the location(s) for each of the topics. The index would then be available for search, and audio-video data would be retrieved in accordance with the locations corresponding to topic words selected.

This process is relatively time consuming and expensive and is therefore not often used. The large and growing source of viewable material makes a convenient technique to automatically index data very desirable.

SUMMARY OF THE INVENTION

The preceding and other shortcomings of the prior art are addressed and overcome by the present invention which illustrates a method, through a system, to process audio-video data for retrieval. The system monitors the audio-video data in conjunction with their corresponding location data and automatically extracts words and picture patterns out of the data.

A voice recognition subsystem identifies words while a pattern recognition subsystem identifies pictures. The words are compiled together with their location data to create a word data file, which is indexed and stored in a data index file. The picture patterns are also compiled with their location data to create a scene data file, which is again stored in the data index file. The system further provides, for example, a computer to selectively retrieve audio-video data through the location data of the identified words or scenes in the data index file.

Another feature of the invention shows combining the word data file and the scene data file with their location data into a word/scene data file, which is indexed and stored in the data index file. So, a user, after identifying the word of interest in the data index file, can display almost instantaneously the most recent scene in the vicinity of the word.

These and other features of this invention will become further apparent from the detailed description and attached figure that follows. In FIG. 1 and description, numerals indicate the various features of the invention, like numerals referring to like features throughout both the drawing and the description.

BRIEF DESCRIPTION OF THE DRAWINGS

FIG. 1 is a generalized block diagram of a system according to the present invention for the indexing and retrieving selected portions of stored audio-video data.

DETAILED DESCRIPTION OF THE PREFERRED EMBODIMENT(S)

FIG. 1 is a generalized block diagram of a audio-video index and retrieval system 10 according to the present invention. The system indexes and retrieves selected portions of data stored on audio-video or other data storage media 12.

In the conventional approach for viewing a preselected portion of audio-video data stored or being stored on a medium 12, the audio-video data would typically be monitored while being recorded or while being retrieved, after earlier storage, on a record/playback deck 14 connected to a monitor 16 via a communication bus 18. In such a conventional approach, the communication bus 18 would typically carry information only from the record/playback deck 14 to the monitor 16, and it 18 would display the video information without interaction from the viewer.

In accordance with the present invention, the communication bus 18 may be a bi-directional bus, and the monitor 16 may be part of an interactive microcomputer 30 as described below with regard to particular embodiments of the present invention.

A conventional system would also include a revolution or frame counter, timing or other position or location data mechanism 20 to continuously indicate the location data unique to the audio-video data being monitored so that individual portions of the data may be identified for later selective retrieval.

In particular applications, it may be convenient for a voice recognition subsystem 28 and the monitor 16 to be included within the interactive microcomputer 30 for automatic data extraction and storage and for user convenience in storing, searching for and reviewing indexed video data. The location data mechanism 20 is connected to the record/playback deck 14 by a bi-directional timing bus 22 so that the location data may be monitored and/or recorded on the media 12.

In accordance with the present invention, audio-video data stored or being stored on the media 12 would be monitored through the record/playback deck 14 in order to extract relevant word and scene information therefrom for later selection. The present invention will be described first in terms of a word indexing and retrieval system for ease of description. Video scene information storage and retrieval will then be described, followed by an enhanced embodiment which integrates both audio and visual information extraction, indexing and retrieval.

The example of a video taped educational lecture discussed above in the Background of the Invention will also be used for the description of the present invention. In a system for indexing word data from an educational lecture stored or being stored on a media 12, the lecture would be monitored in its entirety from the media 12 by a record/playback deck 14. Although it may be displayed for convenience on a monitor 16 during the processing step, this is not required except for training, which will be described separately herein below.

During processing, audio-video data is conveyed from the record/playback deck 14 via a audio-video bus 26 to a voice recognition subsystem 28 which is part of an index processor 24. Location data may be conveyed to the voice recognition subsystem 28 by a timing bus 32 in parallel with the audio-video data on the audio-video bus 26, if required. Alternately, a second copy of the audio-video data on the media 12 may be created to include such location data. In another alternative, information data already associated with the media 12, such as frame count, may be used as the location data.

In any event, the voice recognition subsystem 28 is used to compile word data 35, a base of recognizable words from the audio portion of the audio-video data, together with their individual location data. The word data 35 is then indexed and stored in a data index 34. The voice recognition subsystem 28 may conveniently include a permanent and/or user-modifiable exclusion list so that common words, such as "of", "the", "to", "and" et cetera, which may not be useful for data retrieval purposes, are excluded from the index 34. Alternately, a user-modifiable list of words or phrases to be specifically selected may be included in the voice recognition subsystem 28.

The word data 35 is made available to a microcomputer 30 via the data index bus 36 from the data index 34. The microcomputer 30 then provides convenient interactive access for a user. In the simplest application, data from the data index 34 may be searched by the user to determine when a particular word or phrase occurs in the audio-video data stored on the media 12. Using available word searching software to operate the microcomputer 30, the user may simply determine, for example, when, or even if, during a stored lecture on desktop publishing the word "pixel" is used.

In accordance with conventional searching software, an index term may be found in multiple locations within a taped lecture. The desired location or locations may be selected by searching for the proximity of desired related terms, such as "single". In this way, the portion or portions of the lecture in which the terms "single" and "pixel" were used within a predetermined proximity may be easily identified, indexed and/or selectively retrieved.

A convenient enhancement for this simple system is to provide control of the record/playback deck 14 to the user via the microcomputer 30 and to provide display of the audio-video data on the monitor 16. In this way, the user would have instantaneous convenient access to the data indicated by the index search. This may be desirable for proofing purposes, for example, to determine if the location indicated by the index is the one desired or to select among multiple index indications of the occurrence of the same phrase or phrases. The appropriate portion of the stored lecture may then be viewed by the user or separately stored or recorded, or the data index may be perfected for later use by the same or other users.

In an enhanced embodiment of the present invention, the processor 24 and the microcomputer 30 may be used for training the voice recognition subsystem 28, since some conventional voice recognition subsystems permit user interaction to correct the system's recognition of previously unknown words or words spoken by a particular speaker. The term "pixel," for example, may be recognizable when spoken by some speakers and not by others. Technical terms in specific areas may not normally be included within the data memory of the particular voice recognition subsystem 28 used. However, they can be added by such user interaction.

A convenient step during processing of the audio-video data would be to have user interaction to define, or correct, all words which the voice recognition subsystem 28 did not recognize to a predetermined level of certainty.

In a manner similar to that described above with regard to the indexing of words stored on the media 12, it is also possible to identify and locate non-verbal audio-video information. In this case, the audio-video data would be forwarded to a pattern recognition subsystem 38 via the audio-video bus 26. As noted above, timing data may also be provided on the timing bus 32, if required.

The pattern recognition subsystem 38 would be used to identify scene changes or other events of interest to create scene data 40. The pattern recognition subsystem 38 could be conveniently used for surveillance or similar purposes by identifying changes in an otherwise static or predictable scene. Similarly, predetermined patterns, pattern changes or other identifiable events of interest could be specified by the user for specific recognition or nonrecognition. For the purpose of this discussion, all such data will be described as scene data.

The scene data 40 would then be made available to microcomputer 30 via the data index bus 36 from storage within the data index 34. Appropriate searching software within the microcomputer 30 can then be used, generally in the same manner as discussed above with regard to word data 35, for the user to locate, display and/or proof the scene data 40 imbedded in the video data on the media 12.

In a preferred embodiment of the present invention, the scene data 40 and/or the data index 34 could be enhanced by the addition of visual clues, such as icons, which provide at least a partial visual representation of the type of scene data detected. In addition to use during searching of the scene data in the microcomputer 30, the icons would be of particular use during searching of combined word and scene data, as described below.

Such icons could conveniently be displayed in association with relevant word data for interactive searching. The monitor screen presentation during such searching could conveniently include a series of thumbnail icons or depictions of appropriate scenes. These icons and depictions could be display together with words indexed in association with that scene for proofing or further searching purposes to be discussed below.

In a preferred embodiment of the present invention, the scene data 40 and the word data 35 could be combined in a word/scene data 42 according to their corresponding location data before storing in the data index 34. In this case, when performing a word search of the word data 35, the most recent scene data 40 could be made simultaneously available. This would permit the user to select the same word among multiple indices For example, by means of an icon or other way of portrayal of the scene data, the user of the microcomputer 30 may choose different occurrences of the same word or phrase in different scenes in the audio-video data.

Similarly, the combined word and scene index and retrieval capabilities of the present invention could be used to develop "storyboards" or word and pictorial outlines of audio-video data. For example, the storyboard outline of a particular lecture on video tape might include five storyboards showing the lecturer entering, the lecturer lecturing without props, the lecturer using two different overhead projection displays and the lecturer closing his lecture while referring to a display on an easel. The scene data extraction could then show five scene changes, as described above, together with a key word index for each such scene.

While this invention has been described with reference to its presently preferred embodiments, its scope is not limited thereto. Rather, such scope is only limited insofar as defined by the following set of claims and all equivalents thereof.

What is claimed is:

1. A system for processing audio-video data with associated location data in a storage medium for retrieval, comprising:
   means for extracting the audio-video data in conjunction with its associated location data to produce a first output signal;
   voice recognition means connected to the first output signal for automatically extracting words therefrom to produce a second output signal;
   means connected tot he second output signal for creating word data of the extracted words with their associated location data; and
   means connected to the word data for creating a data index of the words and their associated location data.

2. The system of claim 1 further comprising:
   computing-monitoring means connected to the data index for producing one or more words identified to be of interest; and
   record-playback means connected to the computing-monitoring means for selectively retrieving the audio-video data corresponding to the location data associated with the identified words.

3. The system of claim 1 further comprising:
   pattern recognition means connected to the first output signal for automatically extracting scenes therefrom to produce a third output;
   means connected to the third output signal for creating scene data of the extracted scenes with their associated location data;
   computing-monitoring means connected to the scene data for producing one or more scenes identified to be of interest;
   record-playback means connected to the computer-monitoring means for selectively retrieving the audio-video data corresponding to the location data of the identified scenes; and
   means connected to the scene data and word data for creating a combined index in the data index.

4. The system of clam 3 wherein:
   the computing-monitoring means is connected to the data index to produce one or more combinations of word and scene identified t be of interest; and
   the record-playback means is connected to the computing-monitoring means for selectively retrieving the audio-video data corresponding to the location data associated with the identified word and scene combination.

5. A method of processing stored audio-video data with associated location data for retrieval, comprising the steps of:
   extracting from storage, the audio-video data in conjunction with its associated location data;
   applying the audio-video data to a voice recognition subsystem to automatically extract words included in the audio-video data; and
   creating an index of the extracted words and their respective location data.

6. The method of claim 5 further comprising the steps of:
   searching the word index to identify words of interest; and
   selectively retrieving from the stored audio-video data, the audio-video data corresponding to the location data associated with the identified words.

7. The method of claim 5 further comprising the steps of:
   applying the audio-video data to a pattern recognition subsystem to automatically extract scene data from the audio-video data;
   creating a storage for the scene data and their respective location data;
   searching the stored scene data to identify one or more scenes of interest;
   selectively retrieving from the stored audio-video data, scene data corresponding to the location data of the identified scene; and
   creating a combined index of scenes and words with associated location data from the stored scene data and the word index.

8. The method of claim 7 further comprising the steps of:
   searching the combined index to identify combinations of word an scene identified to be of interest; and
   selectively retrieving the audio-video data corresponding to the location data associated with the identified word and scene combination.

* * * * *